Jan. 22, 1952  J. C. LANG  2,583,056
APPARATUS FOR APPLYING FASTENERS
Filed March 26, 1949  5 Sheets-Sheet 1
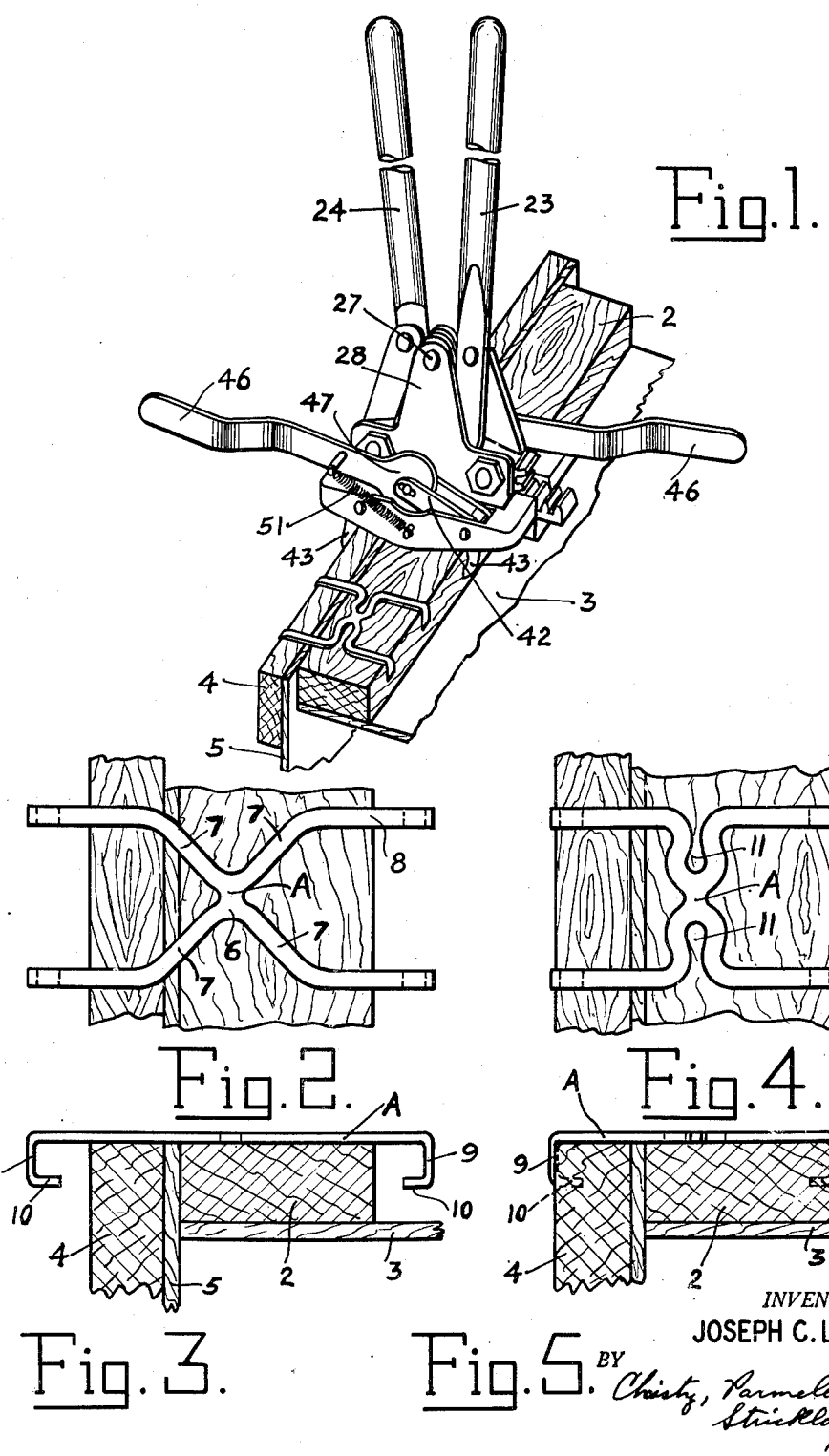
INVENTOR.
JOSEPH C. LANG.
BY Christy, Parmelee &
Strickland
ATTORNEYS

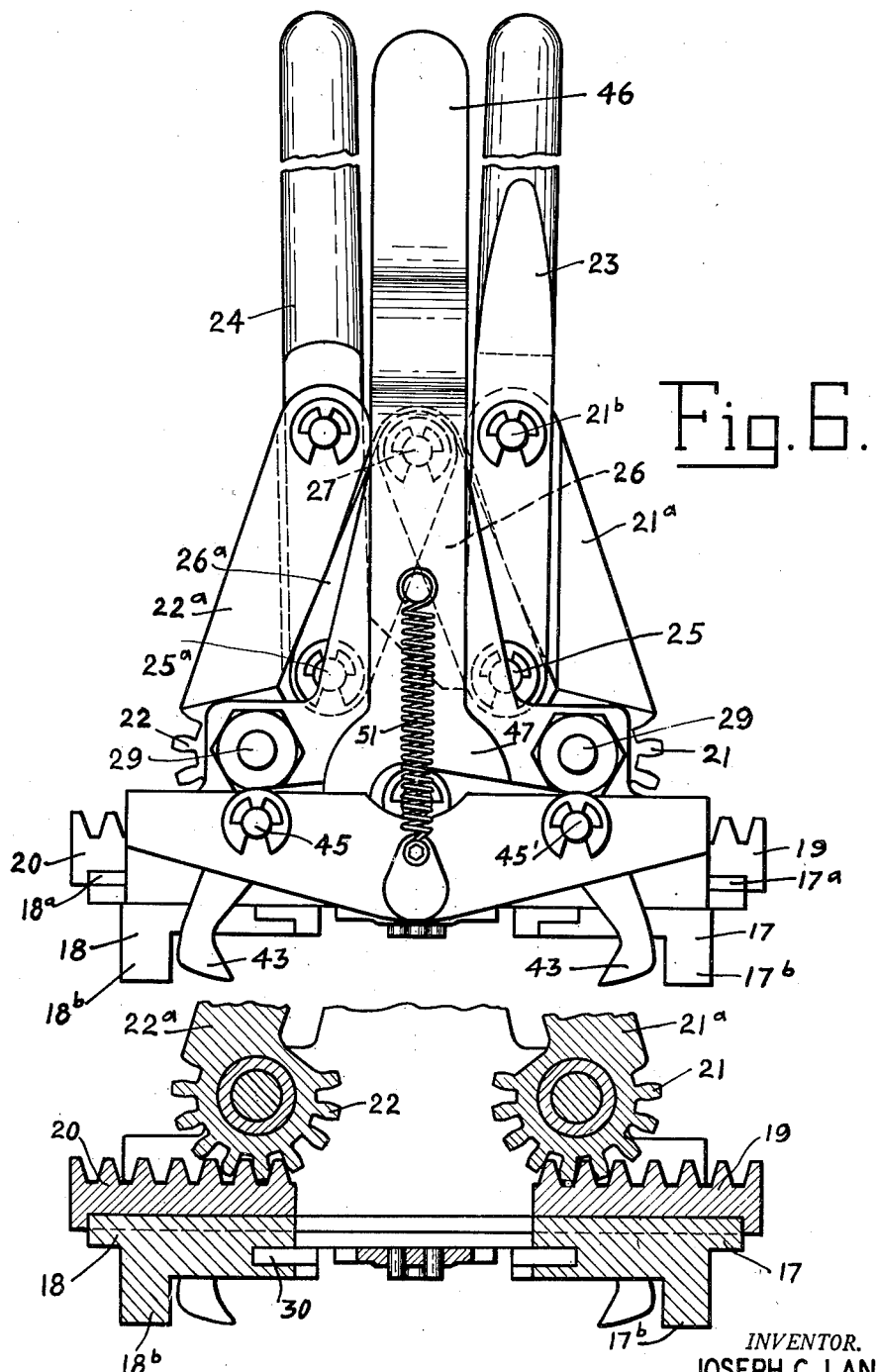

Jan. 22, 1952            J. C. LANG            2,583,056
APPARATUS FOR APPLYING FASTENERS
Filed March 26, 1949            5 Sheets-Sheet 3

*INVENTOR.*
JOSEPH C. LANG.
BY
*ATTORNEYS.*

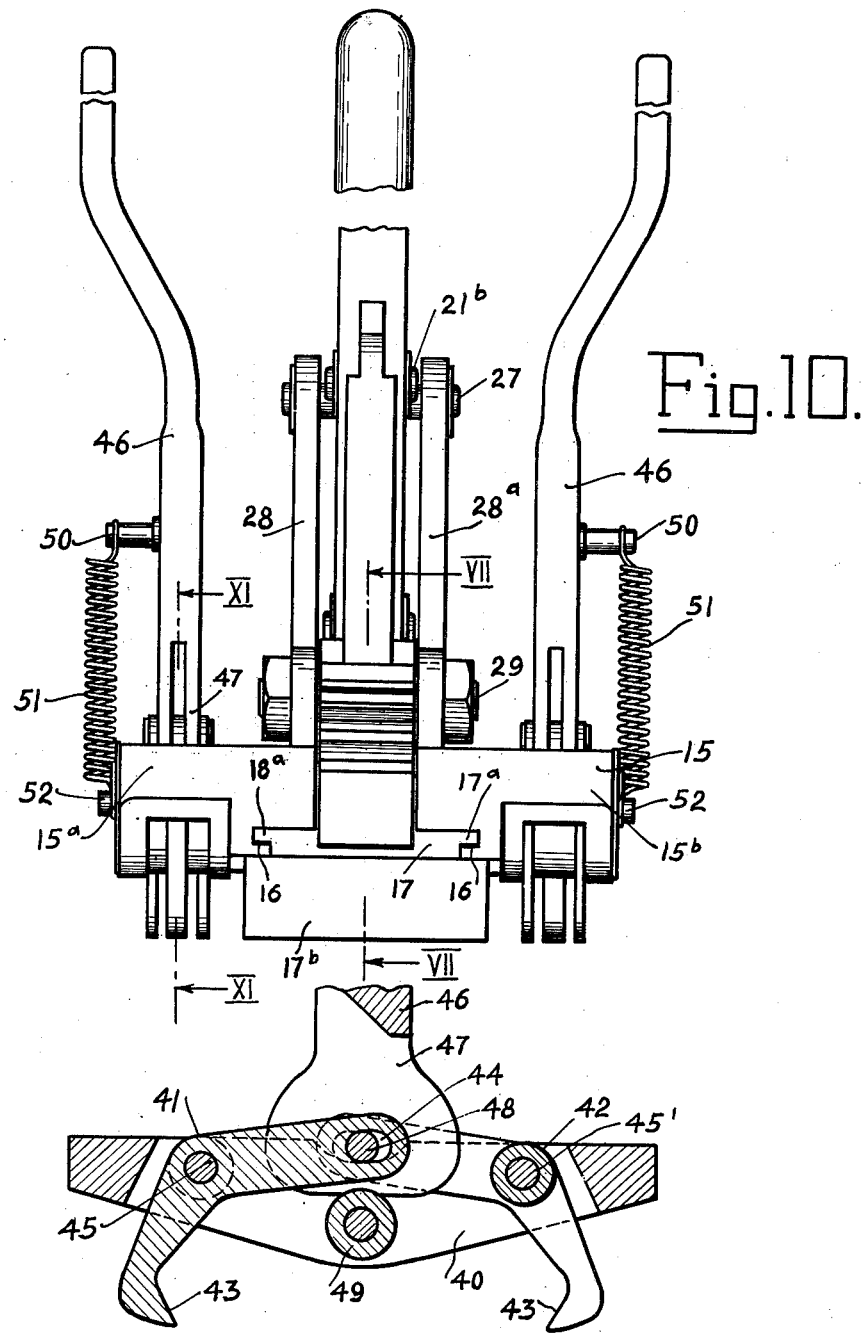

Jan. 22, 1952        J. C. LANG        2,583,056

APPARATUS FOR APPLYING FASTENERS

Filed March 26, 1949        5 Sheets-Sheet 5

INVENTOR.
Joseph C. Lang
BY
Christy, Parmelee & Stricklen
attorneys.

Patented Jan. 22, 1952

2,583,056

UNITED STATES PATENT OFFICE 2,583,056

APPARATUS FOR APPLYING FASTENERS

Joseph C. Lang, Pittsburgh, Pa., assignor to Bocjl Corporation, Pittsburgh, Pa., a corporation of Delaware Application March 26, 1949, Serial No. 83,717

17 Claims. (Cl. 1—50)

This invention relates to the art of applying fasteners, and is for an apparatus for applying fasteners of a type intended to be placed over the edges of the two parts to be joined and then contracted in length to draw the two parts to be so joined together.

The invention has application to the setting of fasteners of the general type disclosed in my copending application Serial No. 599,817, filed July 16, 1945.

Fasteners of the type to which the present invention relates have a central portion from which extend a plurality of divergent arms, one form of the device being generally in the shape of an X with extensions on each leg of the X, these extensions all being parallel. The ends of the extensions are turned downwardly and inwardly to provide a hook or claw. In use the fastener is placed over two pieces to be joined. The X portion of the fastener is then contracted, and the claws of the fastener are pulled toward each other and embedded in the wood of the box or other pieces to be joined.

The present invention has for its object to provide an apparatus for contracting or deforming the fastener to cause it to firmly resist stresses tending to open the fastener or separate the parts which are so joined. Further objects of the invention are to provide a tool of novel construction for use in setting the fasteners, and more particularly, a tool of relatively simple construction and operation which may be operated to initially clamp the parts to be joined together until the fastener is set, and to provide a tool which will exert great force in setting the fastener, but which can be operated with relative ease. Other objects and advantages will be apparent from the the following description.

The invention has particular application to the joining together of panels of shipping boxes or crates, and to the construction of like objects where parallel strips of wood are to be firmly secured together.

In the accompanying drawings, which illustrate a preferred embodiment of my invention:

Fig. 1 is a perspective view showing the machine applied to two pieces of wood to be joined, the parts being in the position which they assume after the machine has been clamped to the strips, but before the levers have been operated to set the fastener. This view also shows in perspective one of the fasteners which has been set or driven;

Fig. 2 is a top plan view showing the fastener in its original form applied to the top of the two strips of wood to be joined;

Fig. 3 is a side elevation of Fig. 2, with the strips of wood and box panels being shown in section;

Fig. 4 is a view similar to Fig. 2 showing the fastener after it has been set;

Fig. 5 is a view similar to Fig. 2, but showing the fastener in closed or set position;

Fig. 6 is a side elevation of the tool or machine, the view being on a larger scale than Fig. 1;

Fig. 7 is a fragmentary vertical section through the center of the machine, the view being in the plane of line VII—VII of Fig. 10;

Fig. 10 is an elevation at right angles to Fig. 6;

Fig. 11 is a fragmentary view of one pair of the gripping claws, the view being a vertical section in the plane of line XI—XI of Fig. 10.

Figure 8:
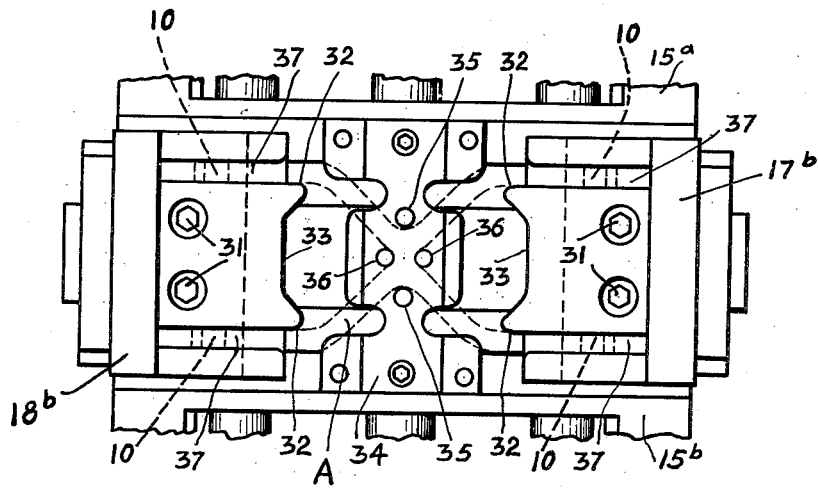
Fig. 8 is a bottom plan view of the fastener-engaging portion of the machine, showing it in open position, with a fastener in dot-and-dash lines.

Referring first to Figs. 1 to 5, there are illustrated fragments of a box of more or less conventional structure, the panels of which are to be joined together. Such box has a cleat or strip 2 along one edge of a plywood panel 3. A similar strip 4, having a plywood panel 5, is placed against it in abutting relation, the strips 2 and 4 being at right angles with relation to each other, and the panel 3, for example, may constitute one side or surface of a box or container, and the panel 5 may constitute another such surface. At the present time it is the common practice to nail these cleats together, and the strength of the box depends very considerably upon the number of nails that are used and the friction with which such nails are engaged in the wood. The present invention is designed to eliminate the nails and accelerate the speed with which these boxes can be constructed and closed, and provide at the same time a stronger and more superior box.

The fastener itself is designated A, and it has a central portion 6 from which extend four diagonal arms 7. Each arm has an extension 8 thereon, and these extensions are all parallel with each other. The outer end of each extension is bent down as shown at 9, and the tip of the extension is turned inwardly at 10 to form a claw or hook. According to the present method, the fastener as shown in Fig. 2 is placed above the parts to be joined, but alternatively, it may be fitted into the bottom of the machine and be frictionally retained therein. The diagonal arms 7 are then engaged and drawn together to the shape shown in Fig. 4. Each of the two pairs of oppositely extending arms 7 are thus drawn together to form a loop, such loop being designated 11 in Fig. 4. When the fastener is thus distorted, its overall length is reduced very substantially. The claw elements 10 are forced into the pieces of wood 2 and 4, as clearly shown in Fig. 5, and the pieces are held together. Any force tending to open the box must be sufficient to either open the loops 11 and tend to restore the fastener to its original X form, or bend the hook-shaped ends of the fastener. The fasteners are made of stout metal stock, and great force is required to so open or stretch them. Depending on the size and contents of the box, the number of fasteners required along each side may be few or several. Ordinarily not less than two are used. On long boxes, such as might be used for the shipping of a refrigerator, as many as three or four fasteners might be used along the long direction of the box.

The box is generally opened by severing the fastener somewhere between its ends, as for example two of the extensions 8 may be cut by the use of nippers, or specially constructed cutters may be used, or the fastener may be cut along its transverse center line by a nipper or suitable cutter. As soon as the fasteners are cut, the panels can separate and the pieces of fasteners can be removed. Shipping boxes or crates can thus be very easily opened, without destroying the several panels of which they are constructed, and the panels can be returned for re-use. The present method of nailing makes the salvaging of the panels expensive, and results in considerable splitting of the wood.

The apparatus for driving the fasteners comprises a metal base 15, which as best shown in Fig. 10, has a left-hand part 15a and a right-hand part 15b. These two parts are separated or spaced from each other, but they are held in fixed relation with respect to one another in the manner hereinafter more fully described. Each of these parts has a rabbeted flange 16 on its under surface, the two flanges together forming a T-shaped slot. The T-shaped slot provides a guideway for slidably retaining two oppositely movable slides or blocks 17 and 18 (see Figs. 6 and 7). The flange portions 17a and 18a respectively of these slide plates, engaging in the recesses 16, serve to prevent the slide plates from dropping out, while permitting them to slide relatively to the base and relatively to each other. Each one of the side plates has a downwardly-extending transverse lug 17b and 18b respectively. Secured to the top of each are rack elements, the rack element on the slide 17 being designated 19, and the rack element on the slide 18 being designated 20.

The two racks 19 and 20 are each engaged by a gear quadrant or fragmentary gear, 21 and 22 respectively (see Fig. 7), these gears each having integral operating extensions 21a and 22a respectively thereon. Each of these extensions is connected to its own operating lever, 23 and 24 respectively, each intermediate the ends of its lever. The lower end of the lever 23 is pivotally fulcrumed at 25 to a link 26, and the upper end of this link is hung on a fixed transverse pivot 27 located between the two levers 23 and 24. The pivotal connection between the lever 23 and the operating extension 21a is designated 21b. In like manner the lever 24 is pivotally mounted at 25a to the lower end of a link 26a, the upper end of the link 26a being also carried on the pivot 27.

Part 15a of the base has an upwardly-extending support 28 thereon, and part 15b has a similarly upwardly-extending rigid support 28a thereon. The pivot pin 27 passes through and is mounted in the upper parts of these supports 28 and 28a. The pinions 21 and 22 are mounted on pivot pins 29 which pass through the hubs thereof, and through the uprights 28 and 28a near the base of said uprights.

The linkage described provides a compound leverage or toggle system whereby, when the levers 23 and 24 are moved in opposite directions away from a vertical center line, motion is transmitted to the quadrants or pinions 21 and 22 to move the slides 17 and 18 toward each other by engagement with their respective racks 19 and 20. By reason of the compound leverage, the slides can be operated with tremendous force without the operator straining to operate the handles 23 and 24, and with relative ease.

Figure 9:
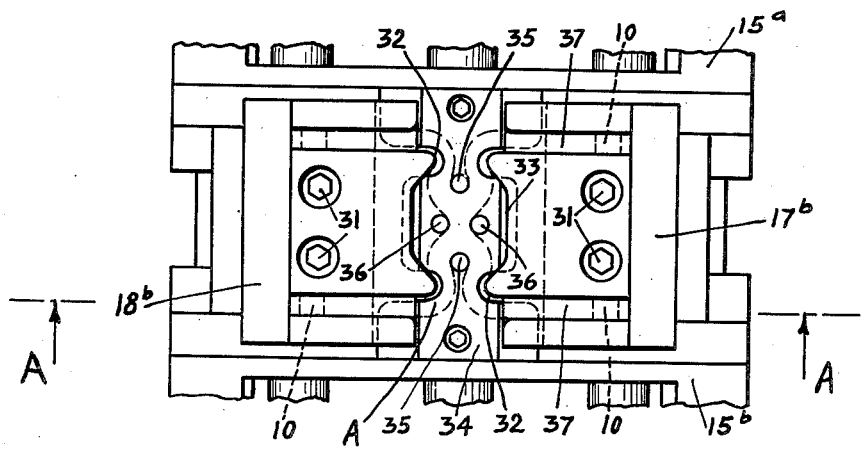
Fig. 9 is a similar view showing the jaws or operating parts of the machine drawn together.

Each of the slides 17 and 18 is shaped to provide a forming die, each of similar construction, these forming dies being best shown in Figs. 8 and 9. Each of them has a forwardly-projecting tooth or lug 32 at each side of its inner edge, there being recesses 33 between the teeth. There are undercuts (see Fig. 7) as indicated at 30 in the operating faces of the two dies. The dies are connected to their respective racks 19 and 21 by means 31.

Extending between the sections 15a and 15b on the transverse center line of the machine is a rigid support 34 having two spaced pins 35 thereon at equal distances each side of the center of the element 34, and lying on the transverse axis of the tool. Likewise, support 34 has two smaller pins equidistantly spaced from the center on the transverse center line thereof, these pins being designated 36. The pins 35 are inside the path of travel of the ears or projections 32 on the slides 17 and 18.

As shown in Fig. 8, the fastener designated as A and shown in dot-and-dash lines can be laid in the bottom of the machine. The pins 36 engage each side of the center of the fastener in the direction of its length, and the pins 35 engage each side of the center of the fastener in the direction of its width. The bottoms of the slides are recessed or channeled as indicated at 37 to receive the parallel extensions 8 of the fastener (see Figs. 8 and 9a). The terminals 9—10 of the fastener are spaced from the shoulders 17b and 18b of the slides at this time.

Figure 9A:
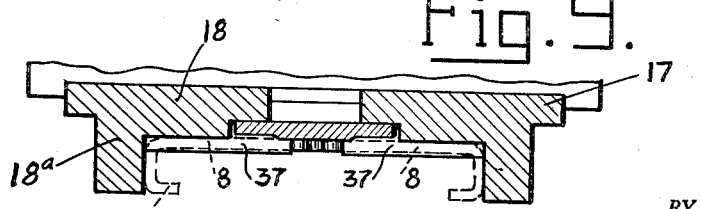
Fig. 9a is a fragmentary sectional view in the plane of line A—A of Fig. 9 showing the manner in which the fastener is received in the jaws.
Figure 12:
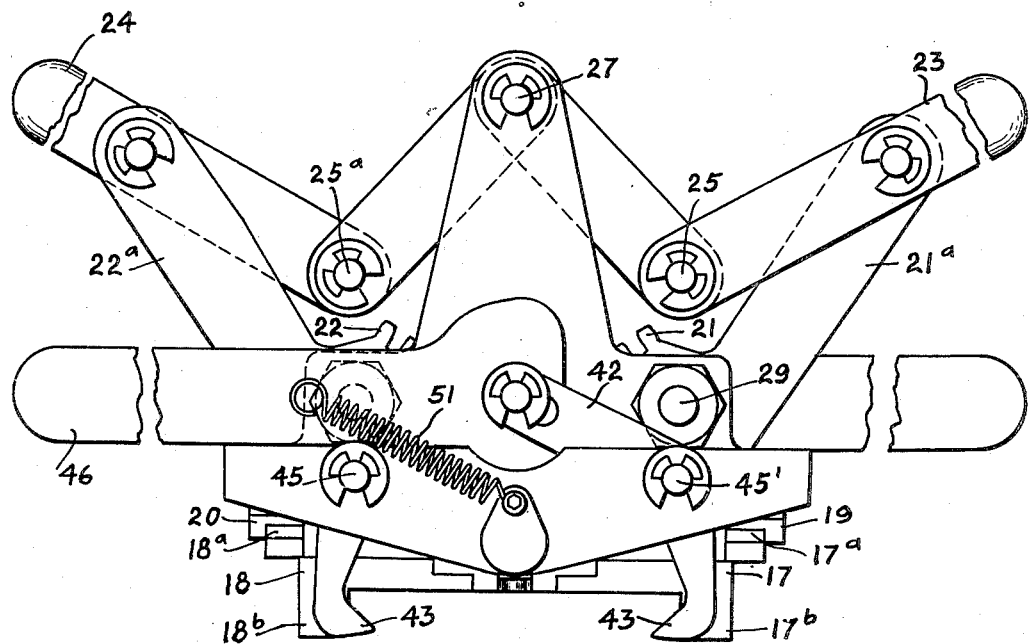
Fig. 12 is a view similar to Fig. 6 showing the position of the handles and linkages after the machine has been operated to set the fastener.

In operation, assuming the fastener to be in the position shown in dotted lines in Fig. 3, and as more clearly shown in Fig. 9a, and the machine to be applied to the parts to be joined as shown in Fig. 1, the levers 23 and 24 are moved in opposite directions, causing two jaws or slides to be moved toward each other. In the initial part of the movement, the ears 32 of the slides will move toward the converging part 7 of the fastener while the ribs 17b and 1 will move into engagement with the downwardly-turned terminal portions 9 of the fastener. Then as the operation continues, the lugs 17 and 18 will exert pressure against the end parts 9 of the fastener, forcing the claws of the fastener into the wood. At the same time the ears 32 will bend the diagonal portions 7 of the fastener toward each other around the pins 35, at each side of the longitudinal center line of the fastener. This bends the center portion of the fastener to the shape shown in Fig. 4 and Fig. 9, while at the same time the claw elements of the fastener are forced toward each other and embedded in the faces of the confronting strips of wood to be joined.

For the purpose of pulling the two strips which are to be joined together into tight abutting relation preparatory to receiving the fastener, and also for the purpose of anchoring the driving tool to the work pieces while the levers 23 and 24 are being manipulated, the device is also provided with the claw mechanism now about to be described. The claw or clamping mechanism on each side of the machine is of identical construction, and one side only will be described in detail, it being understood that the other side is a mere duplicate, and corresponding reference numerals have been used to indicate the corresponding parts. Each of the two base parts 15a and 15b carry these similar mechanisms. The parts on the base member 15a will be described.

The base member 15a is provided with an opening or slot 40 therethrough, and the base portion itself at each side of this opening has a taper downwardly and inwardly so that the base is thickest at the center, as best shown in Fig. 11. Mounted within the slot 40 at each side of the transverse center of the tool are bell crank elements 41 and 42. Element 41 is substantially similar to element 42, except that for reasons of compactness element 41 is formed of a single relatively thick piece of metal and element 42 is formed of two parallel portions secured together, the arrangement being such that the element 41 is centered between the two parts of the element 42. Each of the bell crank elements has an inwardly-turned tooth or claw 43 thereon, the respective claws or points of the two elements being turned toward each other. The horizontal arms of the bell cranks may be at the transverse center of the tool, and each is provided with an elongated opening 44. 45 designates the pivot for the bell crank 41, and 45' designates the pivot for the bell crank 42. A handle 46, having a bifurcated lower end forming a double cam 47 is provided, the bifurcated portion being interfitted with the overlapping inner ends of the two bell cranks. The cam 47 bears against a roller 49, and in Fig. 11 the roller is on the "low" point of the cam. Moving the lever 46 in either direction causes one of the lobes of the cam to ride on the roller, thereby operating the jaws 43. A pin 48 passing through the slots 44 on the lapping ends of the bell cranks and passing through the bifurcated end 47 of the lever 46 serves as a means for connecting the parts and transmitting a rocking motion from the lever 46 to the two bell cranks.

The handle 46 has a pin 50 thereon to which is connected one end of a tension spring 51, while the other end of the tension spring is anchored at 52 to the base block 15a. This tension spring serves to normally hold the handle 46 in a vertical position. When the handle 46 is rocked one way or the other from a vertical position, the inwardly-turned arms of the two bell cranks are lifted. This causes the teeth 43 of the bell cranks to move toward each other. By reason of this arrangement the machine may be clamped to the pieces of wood as shown in Fig. 1 where the two handles 46 on the opposite sides of the machine are thrown clear over, one in one direction, and one in the other. The claws are shown pressing into the two cleats 2 and 4, squeezing them together and anchoring the tool on the work to be fastened.

As above indicated, because there is one of these claw or clamping mechanisms on each side of the base of the machine, with the handles 46 on opposite sides of the pair of fastener operating handles 23 and 24, the tool may be firmly clamped on the work. It is convenient for the operator to pick the tool up by means of the two handles 46, which are normally in a vertical position, set the tool down on the work, and then operate the two handles 46 in opposite directions. When the handles 46 have been swung to one side or the other, the tension spring 51 is then effective in an over-center relation to pull the handle down so that the clamping means will not automatically release itself. The machine is thus held firmly on the work, and the work pieces are clamped together. After the handles 23 and 24 have been operated by moving them in opposite directions to actuate the jaws 17 and 18 and set the fastener, and then retracted, the handles 46 are returned to a vertical position and the tool is lifted off the work.

In the operation of the machine, the fasteners may be placed at intervals on the work in the position shown in Fig. 2, or as previously explained, may be inserted one at a time into the machine. The machine, after operating on one fastener, is picked up and set over top of the next fastener. Instead of working in this way, the operator may invert the machine after each fastener has been applied, and insert another, so that it will assume the dotted line position shown in Fig. 8. The fasteners are of sufficiently uniform size, and the grooves 37 and the pins 35 and 36 are so positioned that when a fastener is set in the tool, it will be retained with sufficient friction so that when the tool is turned over, the fastener will not fall out. Of course after the fastener has been set, the looped portions 11 of Fig. 4 will be disengaged from the pins 35 of the forming machine by merely picking the machine up vertically. The undercut 30 in each of the die elements enables these dies to move in over top of the support on which the forming pins 35 and 36 are carried.

The machine as thus described provides a convenient tool for setting the fasteners. It may first be applied to the work, and then clamped to the work, and in being clamped to the work it also serves to clamp the work to pieces to be joined to a tight relationship. By reason of the great leverage developed through the rack and pinion gearing for moving the jaws 17 and 18, plus the linkage which has been described, the operation of the handles 23 and 24 can be effected with comparative ease permitting a fastener made from heavy stock to be closed with relatively little effort. When the fastener has been so closed, it will resist a very heavy tension before it will give or spread. Extensive tests have indicated that the holding power of the fastener may substantially exceed any strain which the wood or crate itself will accept. Two or three fasteners will take the place of several times that number of nails, and they can be set in less time than the nails can be driven. As above pointed out, by snipping the fasteners with a suitable nipper or tool, the fasteners can be cut, enabling the crate to be opened without breakage of the wood, and enabling the crate or shipping container to be taken apart and saved for re-use.

Thus it will be seen that my invention provides a new method of joining pieces together, and a new and novel apparatus for setting the fasteners.

While I have illustrated and described one specific embodiment of my invention, it will be understood that this is by way of illustration, and that various changes and modifications may be made within the contemplation of my invention and under the scope of the following claims.

I claim:

1. A tool of the class described having a base structure with means on the under face thereof intermediate its ends for fitting about and straddling the central portion of a fastener and to position the tool with respect to the fastener, relatively movable die elements on the under face of the base structure for engaging and bending the fastener with respect to said first-named means, and means for operating said dies.

2. A tool of the class described having a base structure with means on the under face thereof for fitting about and straddling the central portion of a fastener and to position the tool with respect to the fastener, relatively movable die elements on the under face of the base structure for engaging and bending the fastener with respect to said first-named means, means for operating said dies, and relatively movable clamping members on the base member for clamping the base member to work pieces in which the fastener is to be set.

3. A tool of the class described having a base structure, with a group of spaced projections thereon intermediate the ends of the base and arranged to fit between the elements constituting the center of a fastener, a die element on the under face of the base at each side of said group of projections movable toward and away from each other and said group of projections, and means for operating said dies.

4. A tool of the class described having a base structure, with a group of spaced projections thereon arranged to fit between the elements constituting the center of a fastener, a die element on the under face of the base at each side of said group of projections movable in a plane toward and away from each other and said group of projections, and means for operating said dies, said means including a pair of levers, each of which is connected to one of said dies through an operating connection.

5. A tool of the class described having a base structure, with a group of spaced projections thereon arranged to fit between the elements constituting the center of a fastener, a die element on the under face of the base at each side of said group of projections, a rack member secured to each of said dies, a pinion engaging each of said racks, and a lever operatively connected to each pinion providing means for operating the dies.

6. A tool of the class described having a base structure, with a group of spaced projections thereon arranged to fit between the elements constituting the center of a fastener, a die element on the under face of the base at each side of said group of projections, a rack member secured to each of said dies, a pinion engaging each of said racks, and a lever operatively connected to each pinion through a toggle linkage.

7. A tool of the class described having a base structure adapted to be placed over a fastener, means for clamping said base structure to parts which are to be joined by the fastener comprising relatively movable opposed jaws on the base member, means for operating the jaws, a pair of relatively movable die elements on the under face of the base for engaging and bending the parts of a fastener so engaged, and operating means for operating the dies.

8. A tool of the class described having a base structure adapted to be placed over a fastener, means for clamping said base structure to parts which are to be secured together by the fastener comprising relatively movable opposed jaws on the base member, means for operating the jaws, a pair of relatively movable die elements on the under face of the base having portions thereof designed to receive parts of the fastener and having other parts adapted to engage and bend the fastener, means on the under side of the base cooperating with the dies and adapted to set astraddle of the fastener while it is being so bent, and means on the base structure for operating the dies.

9. A tool of the class described comprising a base member, a pair of relatively movable claw elements adjacent each of two opposite edges of the base member, operating means for the claw elements whereby the base member may be set onto work pieces to be joined and clamped thereto and the work pieces drawn together, a pair of relatively movable fastener-bending die members under the base movable horizontally between the two pairs of claw elements, and operating means for the die members.

10. A tool of the class described comprising a base member, a pair of relatively movable claw elements adjacent each of two opposite edges of the base member, operating means for the claw elements whereby the base member may be set onto work pieces to be joined and clamped thereto and the work pieces drawn together, a pair of relatively movable fastener-bending die members under the base movable horizontally between the two pairs of claw elements, operating means for the die members, and fixed forming elements under the base for engaging the fastener and with which the dies cooperate.

11. A tool of the class described comprising a base member, a pair of relatively movable claw elements adjacent each of two opposite edges of the base member, operating means for the claw elements whereby the base member may be set onto work pieces to be joined and clamped thereto and the work pieces drawn together, a pair of relatively movable fastener-bending die members under the base movable horizontally between the two pairs of claw elements, operating means for the die members, and fixed forming elements on the under face of the base member for engaging the mid portion of an X-shaped fastener and located midway between said dies, said forming means comprising four pins arranged in a pattern defining a diamond-shaped parallelogram.

12. A tool of the class described for setting a fastener of X form having divergent arms with parallel extensions thereon, the extensions terminating at their free ends in hook-shaped portions comprising a base member, means for clamping the base member to work pieces which are to be secured by the fastener and for drawing such pieces tightly against one another, a pair of die elements on the under side of the base structure each having an abutment adapted to bear against the hook-shaped portions of a fastener for forcing such hook-shaped portions into the work pieces on which the base member is engaged, means on the under face of the base structure midway between the die elements for engaging and holding the central part of the X-shaped fastener in a position to be engaged by the dies, and means for operating the dies.

13. A tool of the class described for setting a fastener of X form having divergent arms with parallel extensions thereon, the extensions terminating at their free ends in hook-shaped portions comprising a base member, means for clamping the base member to work pieces which are to be secured by the fastener and for drawing such pieces tightly against one another, a pair of die elements on the under side of the base structure each having an abutment adapted to bear against the hook-shaped portions of a fastener for forcing such hook-shaped portions into the work pieces on which the base member is engaged, means on the under face of the base structure midway between the die elements for engaging and holding the central part of the X-shaped fastener in a position to be engaged by the dies, and means for operating the dies, said dies being provided with channels adapted to receive parallel extensions on the X-shaped fastener.

14. Means for setting a fastener of X-shaped form having parallel arms at the extremities of the X-shaped part, said parallel extremities each having a hook element at the free terminal thereof, said means comprising a base member adapted to be set over such a fastener and having a group of four pins on the under face thereof arranged to straddle the central portion of the X-shaped fastener where the several arms intersect, a die element on the under face of the base member at each side of said pins, said die elements having projections adapted to engage the diverging portions of the X-shaped fastener and bend them relatively to said pins, other means on said die elements for engaging said hook-shaped terminals and forcing them into the work pieces to be joined, and means for operating said dies.

15. Means for setting a fastener of X-shaped form having parallel arms at the extremities of the X-shaped part, said parallel extremities each having a hook element at the free terminal thereof, said means comprising a base member adapted to be set over such a fastener and having a group of four pins on the under face thereof arranged to straddle the central portion of the X-shaped fastener where the several arms intersect, a die element on the under face of the base member at each side of said pins, said die elements having projections adapted to engage the diverging portions of the X-shaped fastener and bend them relatively to said pins, other means on said die elements for engaging said hook-shaped terminals and forcing them into the work pieces to be joined, and means for operating said dies, said means comprising a pair of handles pivotally secured to the top of the base structure and an operating mechanism for transmitting motion from each of one of the handles to each of one of the dies.

16. Means for setting a fastener of X-shaped form having parallel arms at the extremities of the X-shaped part, said parallel extremities each having a hook element at the free terminal thereof, said means comprising a base member adapted to be set over such a fastener and having a group of four pins on the under face thereof arranged to straddle the central portion of the X-shaped fastener where the several arms intersect, a die element on the under face of the base member at each side of said pins, said die elements having projections adapted to engage the diverging portions of the X-shaped fastener and bend them relatively to said pins, other means on said die elements for engaging said hook-shaped terminals and forcing them into the work pieces to be joined, means for operating said dies, said means comprising a pair of handles pivotally secured to the top of the base structure and an operating mechanism for transmitting motion from each of one of the handles to each of one of the dies, a pair of hooks on the under side of the base structure at each side of said pair of dies for clamping work pieces to be joined and squeezing them against each other, and an operating lever for each pair of hooks.

17. Means for setting a fastener of X-shaped form having parallel arms at the extremities of the X-shaped part, said parallel extremities each having a hook element at the free terminal thereof, said means comprising a base member adapted to be set over such a fastener and having a group of four pins on the under face thereof arranged to straddle the central portion of the X-shaped fastener where the several arms intersect, a die element on the under face of the base member at each side of said pins, said die elements having projections adapted to engage the diverging portions of the X-shaped fastener and bend them relatively to said pins, other means on said die elements for engaging said hook-shaped terminals and forcing them into the work pieces to be joined, means for operating said dies, said means comprising a pair of handles pivotally secured to the top of the base structure and an operating mechanism for transmitting motion from each of one of the handles to each of one of the dies, a pair of hooks on the under side of the base structure at each side of said pair of dies for clamping work pieces to be joined and squeezing them against each other, and an operating lever for each pair of hooks, said operating levers for the hooks being movable in either direction from a central position for operating the hooks.

JOSEPH C. LANG.

REFERENCES CITED

The following references are of record in the file of this patent:

UNITED STATES PATENTS

| Number | Name | Date |
| --- | --- | --- |
| 1,167,050 | Cox | Jan. 4, 1916 |
| 1,906,289 | Twomley | May 2, 1933 |
| 1,956,808 | Paxton | May 1, 1934 |
| 2,097,774 | Paxton | Nov. 2, 1937 |